United States Patent
Roberts et al.

(10) Patent No.: US 8,024,007 B2
(45) Date of Patent: Sep. 20, 2011

(54) SYSTEM AND METHOD FOR A PROJECTION ENABLED VOIP PHONE

(75) Inventors: Mike A. Roberts, Overland Park, KS (US); Shekhar Gupta, Overland Park, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 562 days.

(21) Appl. No.: 12/180,874

(22) Filed: Jul. 28, 2008

(65) Prior Publication Data

US 2010/0022274 A1    Jan. 28, 2010

(51) Int. Cl.
*H04M 1/00* (2006.01)
(52) U.S. Cl. .............. 455/566; 455/550.1; 455/567
(58) Field of Classification Search .............. 455/566, 455/3.06, 415, 416, 567, 550.1, 556.1; 379/93.23, 379/83.13, 88.21
See application file for complete search history.

(56) References Cited

U.S. PATENT DOCUMENTS

| | | | |
|---|---|---|---|
| 6,512,819 B1 * | 1/2003 | Sato et al. .............. | 379/93.23 |
| 7,085,358 B2 * | 8/2006 | Ruckart .................. | 379/88.19 |
| 7,539,513 B2 * | 5/2009 | Cathey et al. .......... | 455/556.1 |
| 2009/0005087 A1 * | 1/2009 | Lunati et al. .......... | 455/466 |
| 2009/0137275 A1 * | 5/2009 | Amirmokri ............ | 455/556.2 |
| 2009/0137290 A1 * | 5/2009 | Overmann et al. ..... | 455/575.1 |
| 2009/0143098 A1 * | 6/2009 | Shiono .................. | 455/556.1 |
| 2009/0170492 A1 * | 7/2009 | Lee ....................... | 455/418 |

* cited by examiner

*Primary Examiner* — Sonny Trinh
(74) *Attorney, Agent, or Firm* — SNR Denton US LLP (57) ABSTRACT

A system and method for projecting information from a phone. User preferences are received for projection. The user preferences indicate information associated with one or more types of communications. A communication is received. A determination is made whether the received communication is one of the one or more types of communications associated with the user preferences. The indicated information associated with the received communication is projected in response to the determination. The indicated information being projected by a projector integrated with the phone onto a display surface.

18 Claims, 11 Drawing Sheets

SYSTEM AND METHOD FOR A PROJECTION ENABLED VOIP PHONE

BACKGROUND

The use of and development of communications has grown nearly exponentially in recent years. The growth is fueled by larger networks with more reliable protocols and better communications hardware available to service providers and consumers. Users have similarly grown to expect better communications from home, work, and on the go. For example, users now expect faster connection speeds, increased bandwidth, better reliability, and greater availability from all types of communications networks. In many cases, the growth is driven by people looking to give up traditional communications schemes for the efficiency, effectiveness, and availability of new networks, systems, and devices.

For example, options for communications with a telephone have not significantly improved with changing technology. Most communications are still limited to legacy systems and established methods. Many individuals would warmly embrace technologies and features that enhance communications. As a result, there is a need for enhanced features for Voice over Internet Protocol (VoIP), standard telephones, wireless data and voice networks, and other communications devices, mediums, and networks.

SUMMARY

One embodiment, includes a system and method for projecting information from a phone. User preferences may be received for projection. The user preferences may indicate information associated with one or more types of communications. A communication may be received. A determination may be made whether the received communication is one of the one or more types of communications associated with the user preferences. The indicated information associated with the received communication may be projected in response to the determination. The indicated information may be projected by a projector integrated with the phone onto a display surface.

Another illustrative embodiment provides a phone configured for projection. The phone may include display logic configured to determine that a communication includes information selected for display based on user preferences. The phone may also include a projector integrated with a base station. The projector may be in communication with the display logic. The projector may be configured to project the information onto a surface. The phone may also include a camera in communication with the display logic. The camera may be configured to capture an image of the user. The information and the image may be utilized for a video communication.

Yet another embodiment provides a VoIP phone configured for projection. The VoIP phone may include a processor for executing a set of instructions and a memory in communication with the processor operable to store the set of instructions. The set of instructions may be configured to receive user preferences for projecting information, project the information regarding an event onto a surface based on user preferences in response to detecting the event, and project one or more syndicated feeds at an interval based on the user preferences.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

An illustrative embodiment provides a system and method for projecting call or event information from a cell phone or other wireless messaging device. An embodiment may be used to project caller ID information, a current time, battery status, or other information through a wireless messaging device. In one embodiment, a user may determine how and when information is displayed through a projector of a cell phone. The user may select user preferences through use of a graphical user interface. The wireless messaging device may include a program, feature, or instructions for executing the user preferences.

Another illustrative embodiment provides a system and method for projecting calls, events, or other information from a land line phone. The land line phone is a data enabled phone configured to project information and images through one or more integrated or external projectors. In one embodiment, the land line phone is a home or office VoIP phone. The land line phone may be used to project caller identification (ID) information, time information, presentations, images, videos, holograms, pictures, or updates from syndicated feeds. A user may establish user preferences that specify how and when information will be displayed through the use of a projector integrated with the land line phone. A user may select the user preferences through the use of a graphical user interface.

Figure 1:
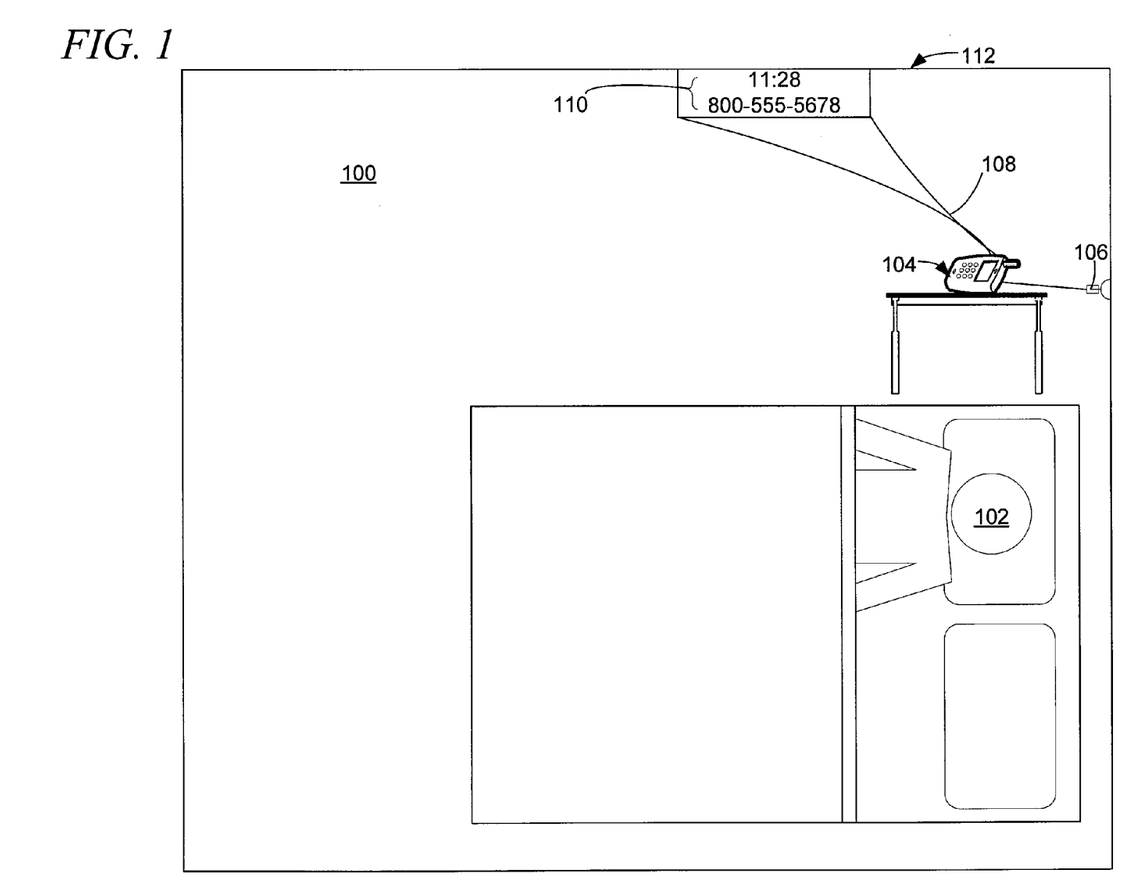
FIG. 1 is a pictorial representation of a wireless environment in accordance with an illustrative embodiment.

FIG. 1 is a pictorial representation of a wireless environment in accordance with an illustrative embodiment. The wireless environment 100 may include a user 102, a wireless messaging device 104, a charger 106, a projection field 108, projected information 110, and a display surface 112. The wireless environment 100 is an environment in which the user may utilize the wireless messaging device 104. The wireless environment 100 may be a bedroom, dorm, office, hotel room, or other room within a home, business, or organization.

In one embodiment, the wireless messaging device 104 may be a telephone. The wireless messaging device 104 may also be a particular type of telephone, such as a VoIP phone, a cell phone, a personal digital assistant (PDA), a Blackberry® device, a communications enabled mp3 player, digitally enhanced cordless telephone (DECT), a cordless phone, a WiFi® enabled phone, a pager, or other wired or handheld wireless device suitable for voice and/or data communication. The wireless messaging device 104 may be in any number of positions including prone, standing, on a side, propped against something, or docked within a docking station to name a few. The wireless messaging device 104 may be operating on a battery or may be charging or powered by the charger 106. The charger 106 is an external power connection. In one embodiment, the charger 106 may be a docking station or base station. For example, the wireless messaging device 104 may be a cordless telephone that communicates with the base station through a cordless, WiFi, Bluetooth®, or other short range signal.

The wireless messaging device 104 is equipped with one or more projectors or projection elements. In one embodiment, once a communication or event is received or detected by the wireless messaging device 104, the wireless messaging device 104 may generate a projection field 108 to display the projected information 110. The projection field 108 is the light medium that projects or transmits the projected information 110 onto the display surface 112 in the wireless environment 100. The projected information 110 is the information or data displayed by the projector or projection element of the wireless messaging device 104. In one embodiment, the projected information 110 includes caller ID information, device information, or a summary of an incoming message as received. For example, if the wireless messaging device 104 receives an incoming call, the projected information 110 may display the caller's name or an assigned nickname, as well as a phone number. The caller ID information may also include an account number, username, Internet Protocol (IP) address, avatar, picture, or other information associated with the party or device communicating with the user 102 through the wireless messaging device 104.

The projected information 110 may also include information about an event. In one embodiment, the event may be a calendar item, alarm, or other information stored within the wireless messaging device 104. For example, information regarding an appointment or a wake-up alarm may be displayed as part of the projected information 110. The projected information 110 for the illustrative embodiments may also include time information, presentations, images, videos, holograms, pictures, or updates from syndicated feeds.

The projected information 110 may be continuously displayed according to user preferences. For example, the user preferences may indicate that caller ID information is to be displayed during the entire time the wireless messaging device 104 is ringing or for a maximum of ten seconds. In another example, the projected information 110 may be displayed for an alarm once every five minutes until user input or a voice command is received from the user 102.

The projected information 110 may be projected through the use of a projection field 108 generated by a projector of the wireless messaging device 104. The projected information 110 may be displayed and oriented according to user preferences. The projected information 110 maybe projected onto a display surface 112. The display surface 112 is a wall, ceiling, floor, furniture, or other element within the wireless environment 102 that may allow the projection information 110 to be visible to the user 102. For example, the wireless messaging device 104 may transmit the projection field 108 onto the ceiling when placed on a dresser. In another example, the wireless messaging device 104 may project the projected information 110 onto a wall when docked in a cradle or docking station. In one embodiment, the projected information 110 may be projected so that it is horizontally displayed regardless of the positioning of the user. For example, the projected information may include text information that is displayed on the ceiling or at a height of approximately six feet from the ground as if the user were standing up regardless of the position or location of the user.

In the embodiment shown in the wireless environment 100, the wireless messaging device 104 may allow the user 102 to view the projected information 110 without having to pick up the wireless messaging device 104 enabled for projection. In one embodiment, the wireless messaging device 104 may need to be hooked to a charger 106 if the projected information 110 is set for continuous display. Most cell phone users already plug their phones in at night, so this system may provide an extra use for a previously established habit. The projection element of the wireless messaging device 104 is further described in FIG. 2.

Figure 2:
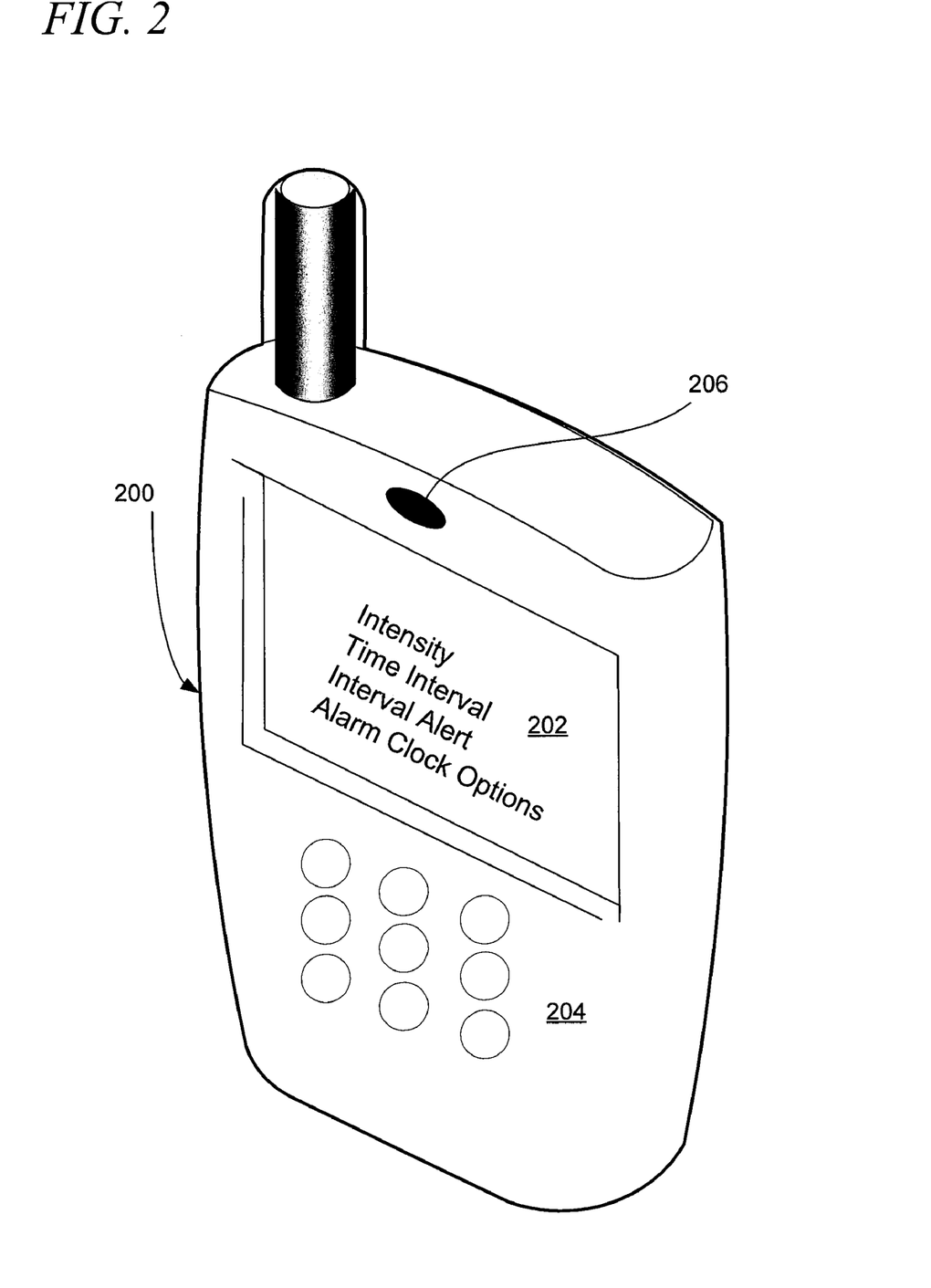
FIG. 2 is a pictorial representation of a wireless messaging device displaying user preferences in accordance with an illustrative embodiment.

FIG. 2 is a pictorial representation of a wireless messaging device displaying user preferences in accordance with an illustrative embodiment. The shown wireless messaging device 200 is a particular implementation of the wireless messaging device 104 of FIG. 1. The wireless messaging device 200 may include a graphical user interface 202, buttons 204, and a projector 206. The graphical user interface 202 may include selection elements and options for configuring the projector 206 as described herein.

The graphical user interface 202 may be configured by a user through the use of buttons 204. In other embodiments, the buttons 204 may be portions of a touch screen or any other interactive element suitable for configuring the wireless messaging device 200.

The projector 206 may include a light emitting diode (LED), digital light processing (DLP), or a laser light source or any other projection element suitable for projecting information. A laser light source may allow the projected information to always be in focus. In another embodiment, a LED may be used with an integrated sensor to determine the distance to the display surface, thereby allowing optimal clarity for the projected images.

The projector 206 may be a fixed position projector, only displaying information straight on. In another embodiment, the projector 206 may pivot, allowing the angle of projection to be adjusted. This may allow a user to display information on a desired surface without using a base to prop up the wireless messaging device 200.

The wireless messaging device 200 may include a projector 206 on either side or the top to allow information to be viewed no matter how the wireless messaging device 200 is set down. In one embodiment, a projector may be included on both sides and a sensor may measure the amount of light to determine which projector should be utilized for displaying information.

In another embodiment, a single projector may be utilized that projects from the top of the wireless messaging device 200. The projector 206 may protrude slightly from the edge or case of the wireless messaging device 200 and be encased in a transparent material for protection. The projector may pivot within the protective casing which may allow a greater range of user preferences. The user may select which surface to project information onto or a sensor may be integrated to determine which surface is closest for projection.

In another embodiment, a user may purchase a battery with an integrated projector. The user may then be able to utilize the benefits of a projector without having to buy a new phone. The projector may communicate with the other components and elements of the phone through the leads utilized by a standard battery. The projector 206 may include any number of accelerometers or other position sensors for properly orienting the displayed information according to position and user preferences.

Figure 3:
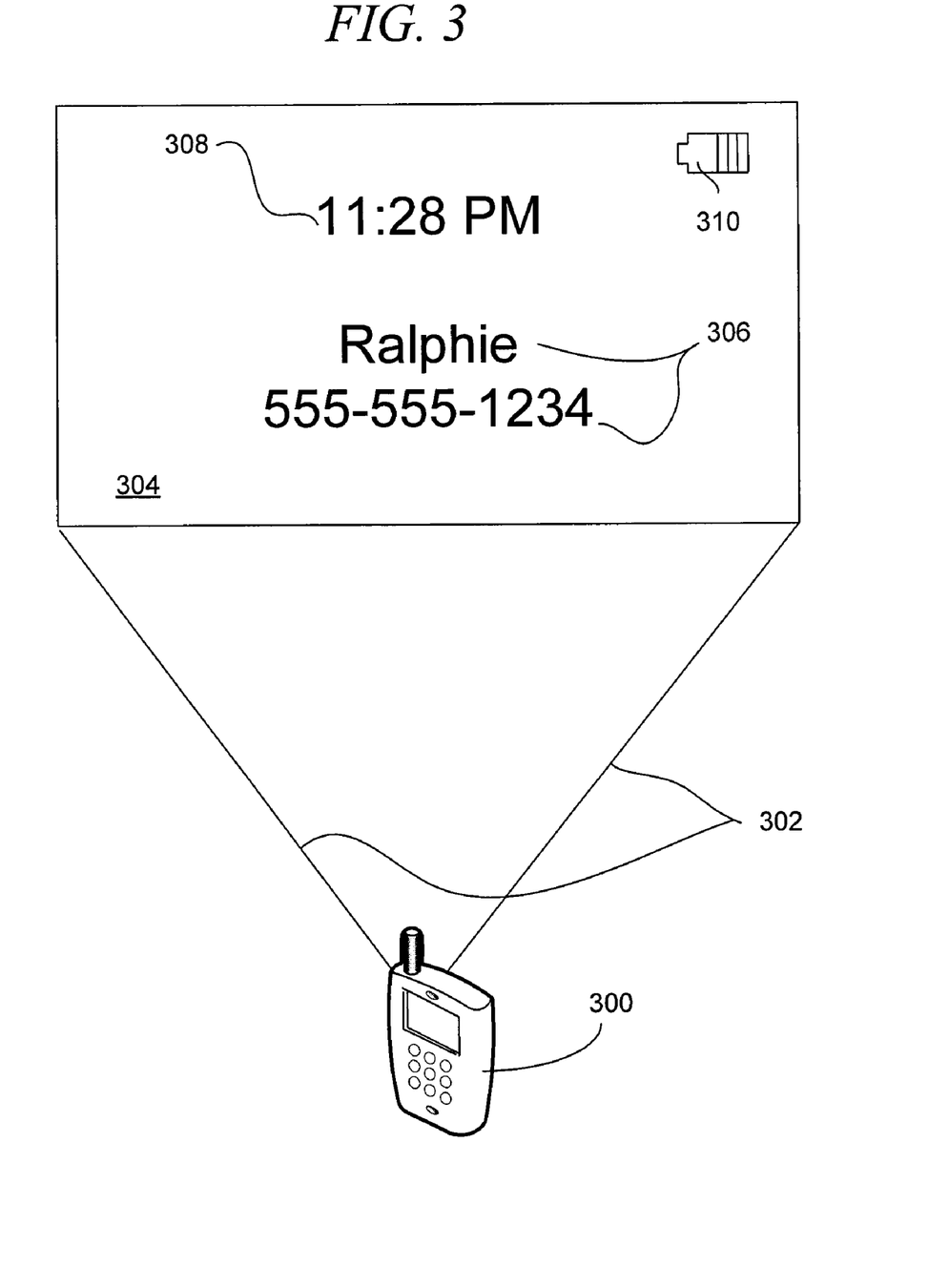
FIG. 3 is a pictorial representation of a wireless messaging device projecting time and call information in accordance with an illustrative embodiment.

FIG. 3 is a pictorial representation of a wireless messaging device projecting time and call information in accordance with an illustrative embodiment. FIG. 3 may include a wireless messaging device 300, a projection field 302, and a projection display 304 which may include call information 306, time information 308, and battery information 310.

The wireless messaging device 300 may create a projection field 302 through the use of an integrated projector to create a projection display 304. In another embodiment, the wireless messaging device 300 may include a battery integrated with a projector or an attachable processor.

The projection field 302 may be created through LED, laser light, one or more projection bulbs, or other light sources. The projection field 302 may also utilize different colors according to user preferences. For example, the wireless messaging device 300 may use extremely bright colors and projection intensity to alert the user of an incoming call and less intense colors and light projection to periodically display the time or battery status.

The projection display 304 may be configured to display information according to user preferences. For example, a user may be able to adjust how large the projected information will appear by establishing user preferences through a user interface. The user may also establish user preferences for activating the projector. For example, the projector of the wireless messaging device 300 may be activated hourly for five seconds to display the time information 308, battery information 310, and a list and number of any missed calls.

The projection display 304 may include call information 306. The call information 306 may include the name of the caller, the caller's phone number, the caller's location (home, cell, work), and other relevant call information identified through caller identification information or information programmed by the user.

The projection display 304 may include time information 308. The time information 308 may include the current time and date. For example, the time information 308 may display time for a number of time zones for reference by the user. The time information 308 may also include a timer or count down until a specified event.

The projection display 304 may include battery information 310. The battery information 310 may allow a user to view the current status of the battery power for the wireless messaging device 300 or if the device is charging. The wireless messaging device 300 may project the battery information 310 more frequently as the battery approaches exhaustion so that the user may charge the battery or take another action.

The projection display 304 may be set to rotate at intervals. A user may set down the wireless messaging device 300 the wrong direction which may mean the projected information would appear upside down to the user. The display may rotate at a customizable interval to allow the user to read the projected information no matter how the device is placed. Alternatively, the wireless messaging device 300 may utilize accelerometers or position sensors to ensure that the projection display 304 is projected horizontally regardless of the positioning of the wireless messaging device 300. In one embodiment, the projector of the wireless messaging device 300 may utilize one or more mirrors, lenses, or wave guides to project information for display to the user. For example, a pivotally mounted fiber optic laser projector may transmit the projection display 304. The wireless messaging device 300 may also use a laser or other measurement system to display information on preset surfaces or at a specified height. For example, the wireless messaging device 300 may be configured not to display information on windows or uneven surfaces, such as blinds or pictures at a height of three to four feet below the ceiling of a room.

The projection display 304 may be created through projecting all of the information at once, or the information may be traced by the light source to allow the user to view the information. Information tracing may be utilized to reduce the amount of energy the wireless messaging device 300 uses to project the projection field 302.

Figure 4:
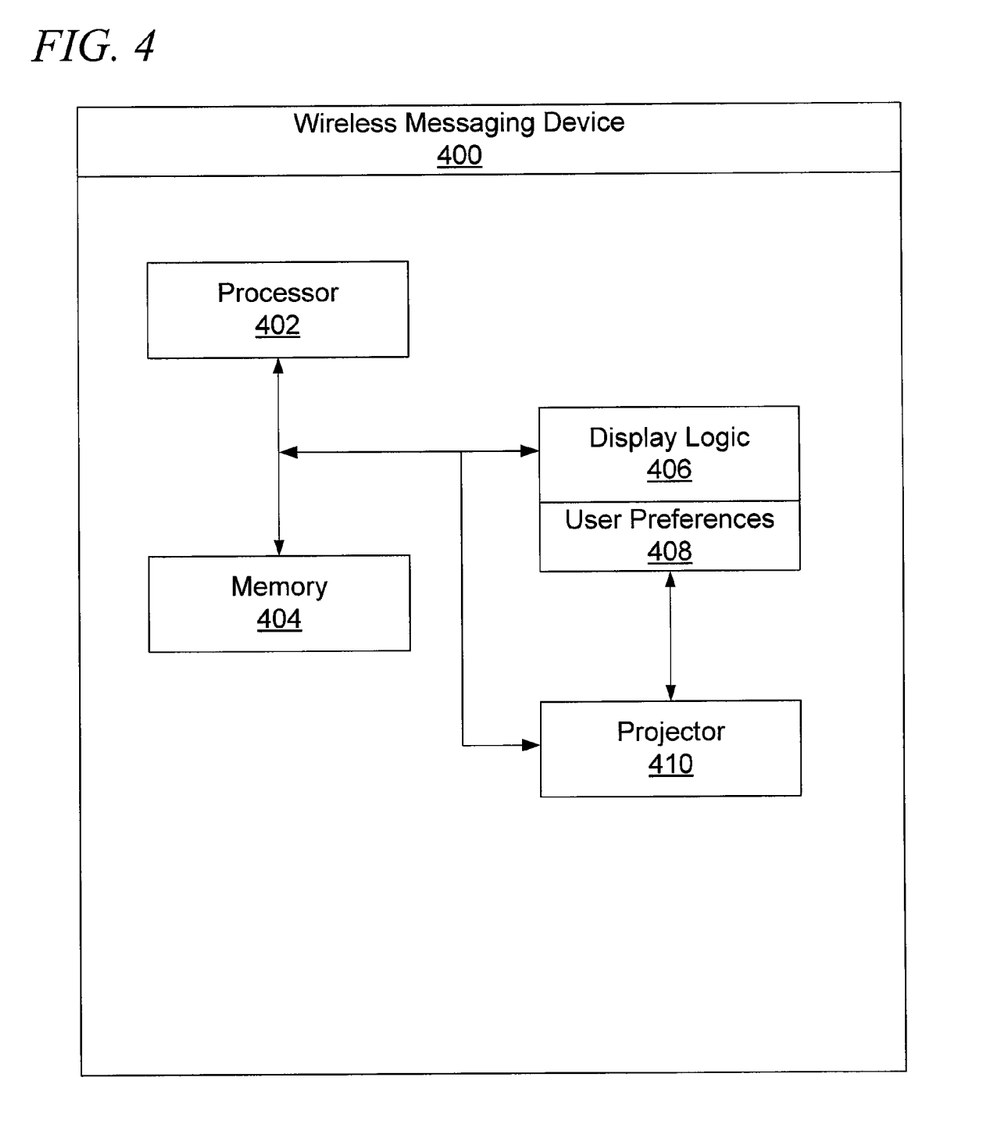
FIG. 4 is a block diagram of components of a wireless messaging device used to project information in accordance with an illustrative embodiment.

FIG. 4 is a block diagram of components of a wireless messaging device used to project information in accordance with an illustrative embodiment. A wireless messaging device 400 may include a processor 402, memory 404, display logic 406 controlled by user preferences 408, and a projector 410. The wireless messaging device 400 is a particular implementation of the wireless messaging device 104 of FIG. 1.

The wireless messaging device 400 may include a processor 402 for formatting, carrying out, responding to, and processing the basic instructions stored in the memory 404, as well as processing programs, commands, managing, and otherwise controlling the projector 410.

The processor 402 is circuitry or logic enabled to control execution of a set of instructions. The processor 402 may be a microprocessor, digital signal processor, central processing unit, or other device suitable for controlling an electronic device including one or more hardware and software elements, executing software, instructions, programs and applications, converting and processing signals and information, and performing other related tasks. The processor 402 may be a single chip or integrated with other computing or communications elements.

The memory 404 is a hardware element, device, or recording media configured to store data for subsequent retrieval or access at a later time. The memory 404 may be static or dynamic memory. The memory 404 may include a hard disk, random access memory, cache, removable media drive, mass storage, or configuration suitable as storage for data, instructions, and information. In one embodiment, the memory 404 and processor 402 may be integrated. The memory may use any type of volatile or non-volatile storage techniques and mediums.

Figure 7:
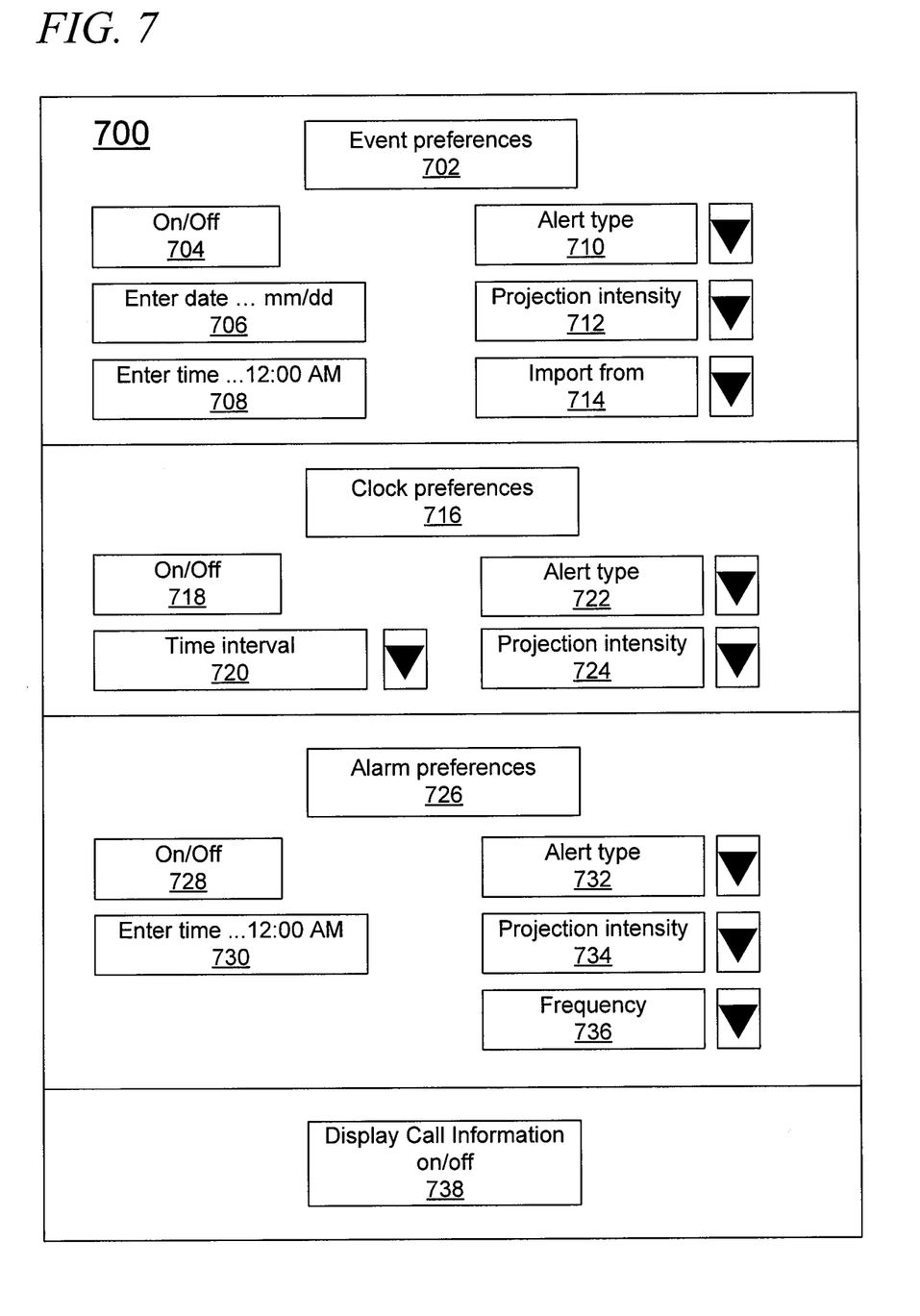
FIG. 7 is a pictorial representation of a graphical user interface for configuring projection of call or event information in accordance with an illustrative embodiment.

The display logic 406 is the hardware and software components that controls the projector 410 of the wireless messaging device 400. The display logic 406 may be configured according to user preferences 408 through the use of a graphical user interface as shown in FIG. 7. The display logic 406 and user preferences 408 may control when the projector 410 is activated or deactivated, the settings for operating the projector 410, and the information displayed.

The projector 410 is a light-emitter. The projector 410 may be any device suitable for projecting caller identification information, text, or images for enlarged viewing. The projector 410 may have an integrated light source, optics system, electronics, and displays for the purpose of projecting an image onto a wall, ceiling, or any other suitable surface. The projector may utilize LED, digital light processing (DLP®), one or more bulbs, or laser technology for a light source.

In one embodiment, the projector 410 is multiple fiber optics or wave guides that are pivotally mounted to the wireless messaging device 400. The fiber optics act as wave guides for projecting various colors and parts of the displayed information simultaneously. The broadcasting elements of the projector 410 may be focused or directed at a specified surface. In one example, the projector 410 may be encapsulated by a semi-circle of plastic or glass that provides protection and allows the projected information to be displayed at 180 degrees or more in the x or y axis and 360 degrees in the other axis.

The user preferences 408 may store preferences for directing the projector 410 during specific times of day, locations, or uses. For example, phone calls and time information displayed at night may be displayed on the ceiling and alerts may be displayed on a designated wall. The projector 410 may be pivotally directed at the selected display surface automatically or based on the user preferences 408.

In another embodiment, the wireless messaging device 400 may be a VoIP phone configured to perform the processes and features herein described. Accordingly, the wireless messaging device 400 may include any number of other components including interfaces, displays, transceivers, logic, circuitry, or other elements for the wireless, VoIP, and POTS embodiments herein described.

Figure 5:
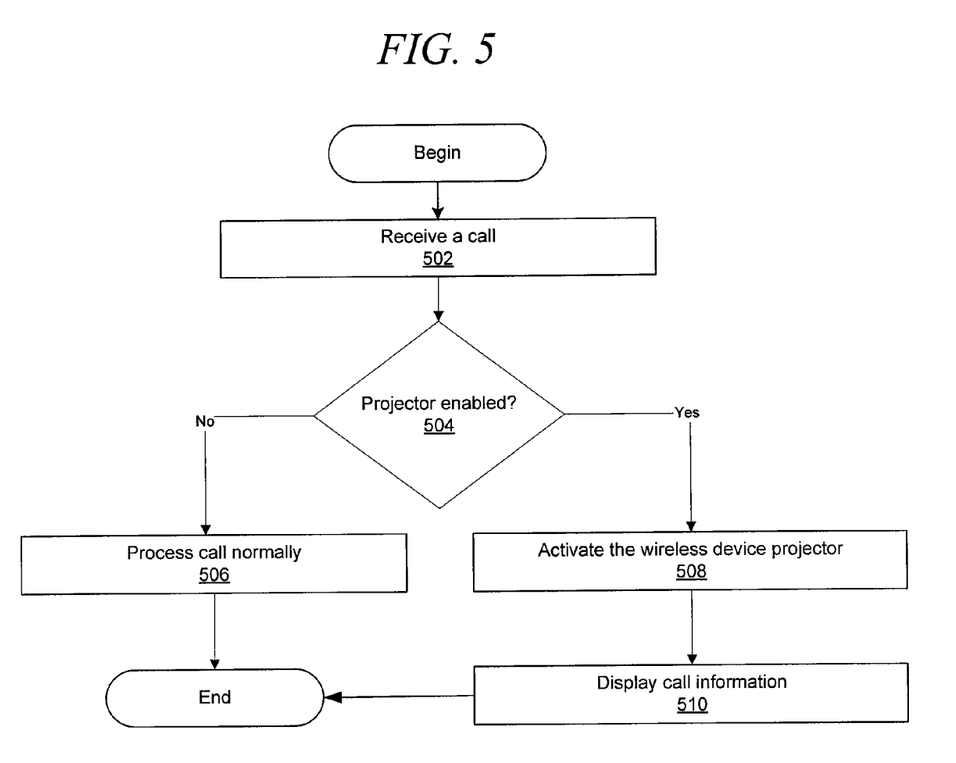
FIG. 5 is a flowchart of a process for projecting call information in accordance with an illustrative embodiment.

FIG. 5 is a flowchart of a process for projecting call information in accordance with an illustrative embodiment. The process of FIG. 5 may be implemented by a wireless messaging device enabled for voice communications. The process may begin by receiving a call (step 502). In one embodiment, the call may be the electronic signaling received by the phone before the wireless messaging device begins to ring. The call of step 502 may also be a message, such as an email, text, picture, video, or voice message.

Next, the wireless messaging device determines whether the projector is enabled (step 504). The determination of step 504 may be made based on user preferences, configurations, or settings. In one example, the projector may need to be turned on to be enabled. For example, the user may have activated the projector to display call information at night after 8:00 p.m. In another example, the projector may be disabled once the battery power drops below a specified level or threshold. If the projector is not enabled, the wireless messaging device processes the call normally (step 506).

If the projector is enabled in step 504, the wireless messaging device activates the projector (step 508). The projector may be activated to display caller identification information, data, information, or other images. The projector may be activated by transmitting a projection field on one or more surfaces within a room. In one embodiment, the projector may determine the nearest display surface and project the call information on that surface. The projector may be a fiber optic projector that may be directionally pointed and focused by the wireless messaging device. The projector may use positioning sensors to determine an orientation for projecting the call information on a pre-established display surface, such as a wall or portion of the ceiling.

In one embodiment, the wireless messaging device may include multiple projectors and only the projector that is properly positioned to display the call information may be activated. For example, a cell phone may be rectangularly shaped and include a projector on both sides near the display and the battery. If the cell phone is laid on a table with the display down, the projector near the battery may be activated for displaying the call information and vice versa. In another embodiment, the wireless messaging device may rotate the projector to a desired location and direction before projecting call information.

Next, the wireless messaging device projects the call information (step 510). The call information may be displayed according to user preferences established by the user. For example, the user preferences may indicate that a name, number, battery status, and caller picture, if entered in the directory of the phone, be displayed when a call is received.

Figure 6:
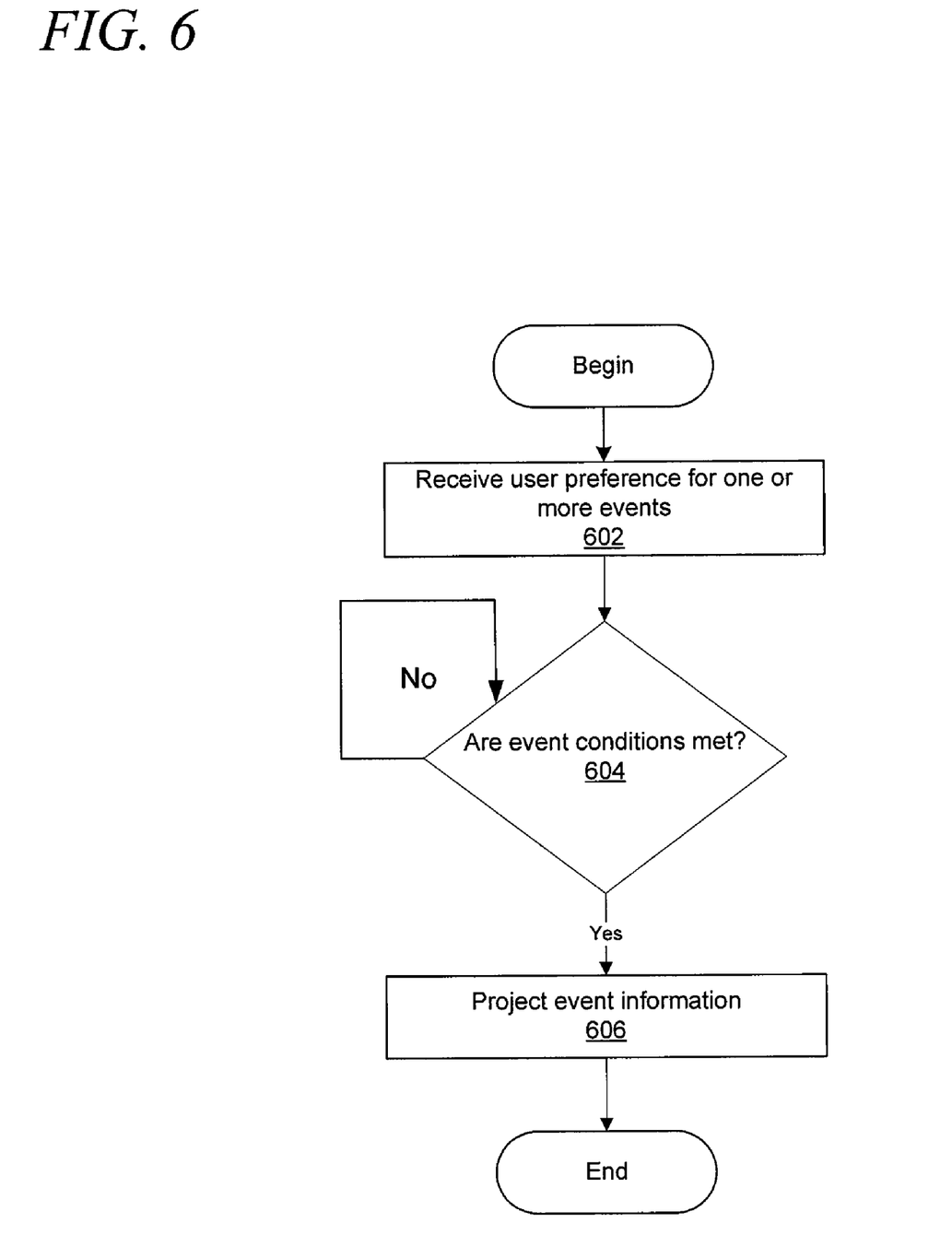
FIG. 6 is a flowchart of a process for projecting event information in accordance with an illustrative embodiment.

FIG. 6 is a flowchart of a process for projecting event information in accordance with an illustrative embodiment. The process of FIG. 6 may be implemented by a wireless messaging device equipped with one or more integrated or external projectors. The process may begin by receiving user preferences for one or more events (step 602). The events may be calendar items, alarms, reminders, messages received or sent, or other items programmed into the wireless messaging device. The user preferences may specify the settings and configuration for displaying information, data, and/or images that are displayed by the projector of the wireless messaging device. For example, the user preferences may indicate conditions, such as all calendar reminders for a day are displayed at 7:15 a.m.

Next, the wireless messaging device determines whether event conditions are met (step 604). The determination of step 604 may be made by a program, logic, or other elements of the wireless messaging device. The event conditions may be specified by the user preferences of step 602, settings and external input. If the event conditions are not met, the determination of step 604 is repeated.

If the event conditions are met in step 604, the wireless messaging device projects the event information (step 606). The event information may be projected to a random or pre-selected display surface. For example, during the night, any alarms or alerts may be displayed on the ceiling of a bedroom or hotel room where the user is sleeping. During the day, the wireless messaging device may be configured to broadcast the event information directly from an end of the wireless messaging device. The orientation of the event information may also be configured.

FIG. 7 is a pictorial representation of a graphical user interface for configuring the projection of a call or event information in accordance with an illustrative embodiment. The graphical user interface 700 may include an event preferences menu 702 which may include an on/off element 704, a date selection element 706, a time selection element 708, an alert type selection element 710, a projection intensity selection element 712, and an import selection element 714. The interface 700 may also include a clock preferences menu 716 which may include an on/off element 718, a time interval selection element 720, an alert type selection element 722, and a projection intensity selection element 724. The interface 700 may also include an alarm preferences menu 726 which may include an on/off element 728, a time selection element 730, an alert type selection element 732, a projection intensity selection element 734, a frequency selection element 736, and an on/off element for call information 738. The various components or elements of the graphical user interface 700 may be icons, drop down menus, buttons, portions of a touch screen, indicators, or other interactive elements for receiving input from a user.

The graphical user interface 700 may include an event preferences menu 702. The event preferences menu 702 may include selection elements that allow a user to establish user preferences indicating when event information will be projected and if the projection of the event is accompanied by an alarm. The on/off element 704 may allow a user to activate or deactivate the projection of event information.

The date selection element 706 may allow a user to specify a date for a specific event. For example, the wireless messaging device may be configured to project information as a birthday reminder on the date of a loved one's birthday. Similarly, business or personal appointments may be entered through the event preferences menu 702.

Time selection element 708 may allow a user to input a time that the event information is projected. Continuing with the birthday example, a user may want the alarm to go off early in the morning with the event information projected on a display surface so that the user may remember to call during the day.

Type selection element 710 may allow a user to specify an alert type to accompany the projected information. An alert may include a tone, a ring, vibration, or any other suitable alert utilized by wireless messaging devices.

Intensity selection element 712 may allow a user to adjust the intensity of the projected information. The light intensity of the projected information may be linked with a priority of the event or with a user selection. For example, if the event has a high priority to the user, the wireless messaging device may be adjusted to display information at the projector's brightest setting.

Import selection element 714 may allow a user to import events from external devices, applications, or sources. For example, events may be synchronized, extracted, or received from an electronic calendar program. Importing events from an electronic calendar may allow a user to get the full benefit of having an integrated projector. Event information may be retrieved from a server that stores email information, calendar items, or other alerts that may be uploaded to the wireless messaging device.

The graphical user interface 700 may also include the clock preferences menu 716. The clock preferences menu 716 may include selection elements that control the display of time information. The on/off element 718 may allow a user to activate or deactivate the projection of time information.

The interval selection element 720 may allow a user to specify the frequency or time period that controls how often the time information is displayed. For example, a user may specify that time information to be displayed in half hour or hour intervals throughout the night from 8:00 p.m. to 8:00 a.m. Alert type selection element 722 may allow a user to specify an alert to accompany the projected information. An alert may include a tone, a ring, vibration, or any other suitable alert utilized by wireless messaging devices.

Projection intensity selection element 724 may allow a user to adjust the intensity of the projected information. The projection intensity selection element 724 may allow a user to specify a color, light intensity, and other projection features that control the information and images projected from the projector. For example, a user may want to have the time projected throughout the night at a very low intensity using the color blue.

The graphical user interface 700 may include an alarm preferences menu 726. The alarm preferences menu 726 may include selection elements to control when the projector may accompany an alarm. The on/off element 728 may allow a user to activate or deactivate the projection of alarm information. The time selection element 730 may allow a user to enter a time for the projector to display time information to serve as an alarm clock. Type selection element 732 may allow a user to specify an alert to accompany the projected information. An alert may include a tone, a ring, vibration, or any other suitable alert utilized by wireless messaging devices.

The projection intensity selection element 734 may allow a user to adjust the intensity of the projected information. For example, a user may want the projector to be on its brightest setting to help them wake up in the morning.

The frequency selection element 736 may allow a user to determine how frequently the alarm goes off and is accompanied by the projector. For example, a user may wish to have the projector go off with an alarm at a specified time, every morning, weekdays, or weekends. The on/off element 738 may also allow a user to determine whether call information is projected.

Another illustrative embodiment provides a system and method for projecting a call, event, or other information from a phone. In one embodiment, the phone may be a data enabled land line phone configured to project information and images through one or more integrated or external projectors. However, the phone may be a VoIP phone, DECT phone, cordless phone, WiFi enabled phone, or wireless communication device suitable for communicating data, information, and images through a network connection or other phone line. The phones may be used to project caller identification (ID) information, time information, presentations, images, or updates from syndicated feeds. A user may establish user preferences that specify how and when information will be displayed through the use of a projector integrated with the land line phone. A user may select the user preferences through the use of a graphical user interface.

Figure 8:
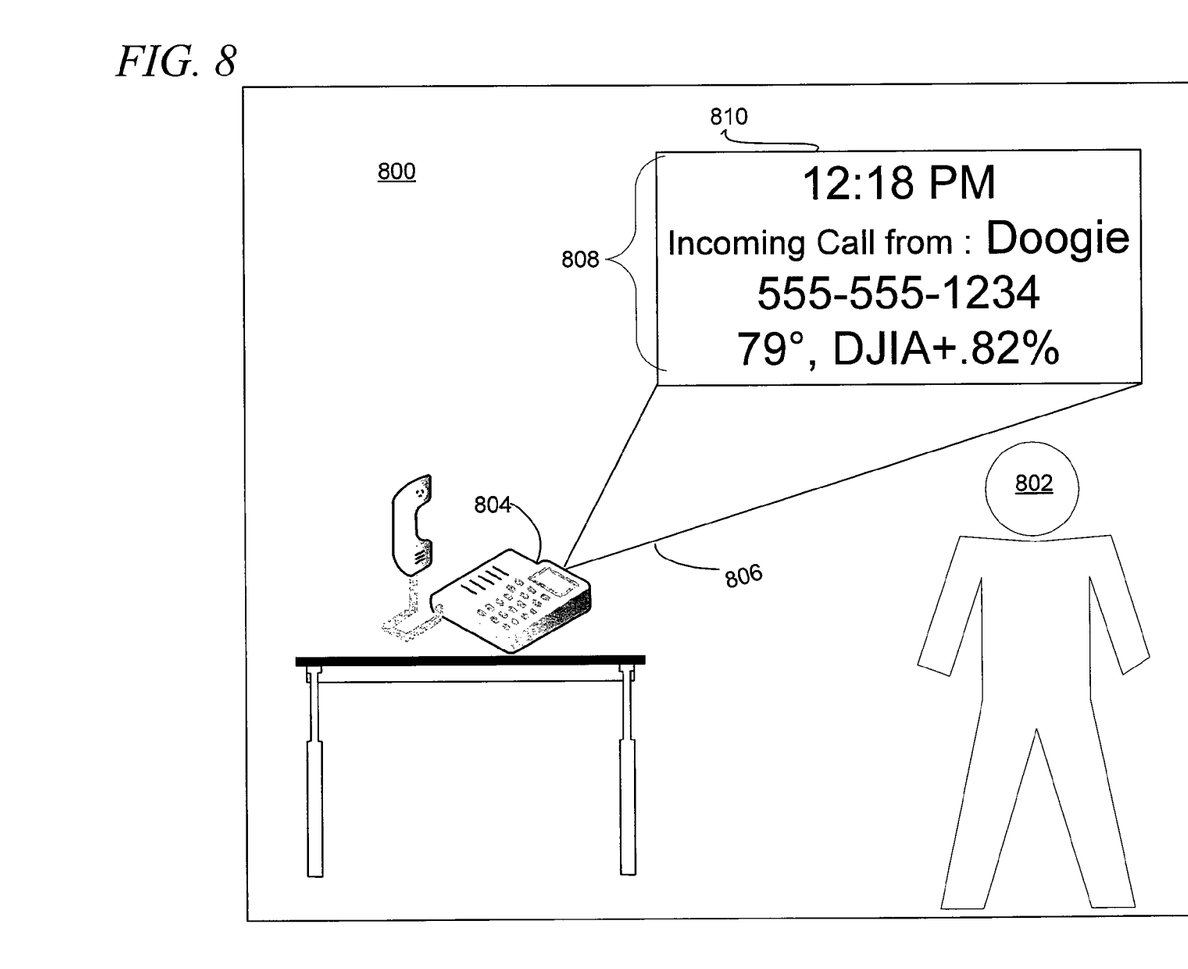
FIG. 8 is a pictorial representation of a projection environment in accordance with an illustrative embodiment.

FIG. 8 is a pictorial representation of a projection environment in accordance with an illustrative embodiment. The projection environment 800 may include a user 802, a projector phone 804, a projection field 806, projected information 808, and a display surface 810.

In the projection environment 800 the user 802 may be able to view the current time, streaming information from one or more sources or call information 808 without having to pick up the projection phone 804 or accessing a computer or similar device. The projection phone 804 is a voice communications device configured to project data, text, or other images herein referred to as information onto one or more display surfaces. In one embodiment, the projection phone 804 may be a VoIP, digitally enhanced cordless telephone (DECT), cell phone, or a WiFi® enabled phone. In another embodiment, the projection phone 804 may be a standard analog phone.

Once an incoming call or event information is received, the projection phone 804 may generate a projection field 806 to display the desired information 808. In one embodiment, the projection field 806 may display the image of a user for enabling a video phone call. In another embodiment, the projection phone 804 may display a presentation, document, or feature sent to the user 802 from another projection phone, computer, wireless messaging device, or client. For example, during a conference call the projection phone 804 may display a presentation communicated to multiple users in order to view and follow along with the content and elements communicated by a presenting party. The information may continuously be displayed during a call, until the user deactivates the projector or projection feature of the projection phone 804, or pre-established times or time intervals. For example, a user may set the projection phone 804 to project the time every hour or half hour.

The display information 808 may be projected through the use of a projection field 806 created by an integrated projector. The display information 808 may be configured according to user preferences. The user may change the size of displayed information, color, amount of time the information is displayed, or a number of other user preferences.

The display information 808 may be projected onto a display surface 810. This surface may be a wall, the ceiling, a screen, or any other suitable surface to allow the user 802 to view the desired information. In one example, the projection phone 804 may project the information onto a small screen or portion of a desk. The projection phone 804 may be positioned so that the projection field 806 projects the display information 808 on to the display surface 810 selected by the user. The user 802 may select the display surface 810 based on the current usage of the projection phone 804 and the information displayed.

In one embodiment the display information 808 may include call information. The call information 808 may include the name of the caller, the caller's phone number or IP address, a picture or image of the caller, and the caller's location (home, cell, work).

Figure 9:
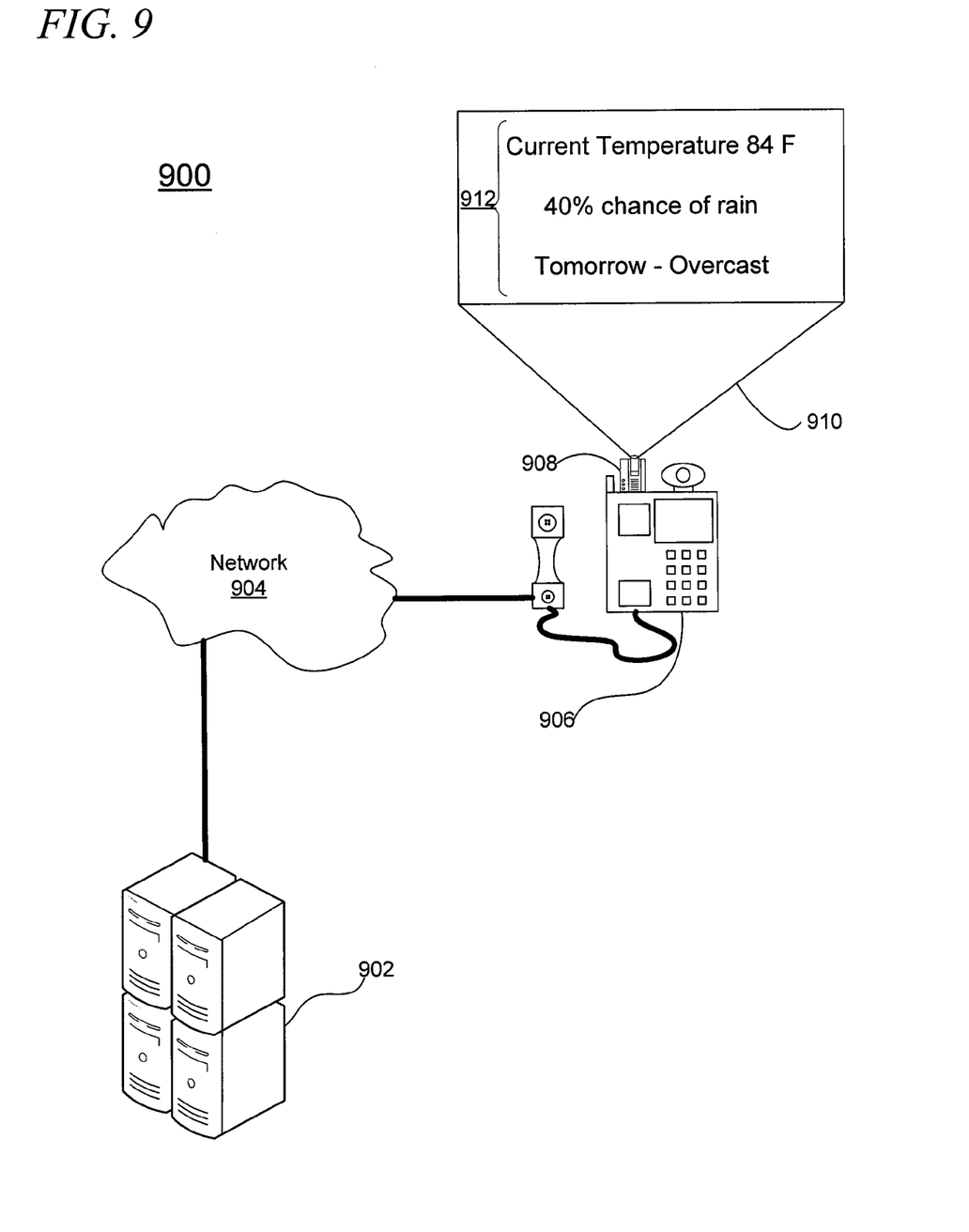
FIG. 9 is a pictorial representation of a projection phone linked to a server projecting feed information in accordance with an illustrative embodiment.

FIG. 9 is a pictorial representation of a projection phone linked to a server projecting feed information in accordance with an illustrative embodiment. In one embodiment, a projection system 900 may be utilized to display information to a user. The projection system 900 may include a server 902, a network 904, a projection phone 906, an integrated projector 908, a projection field 910, and display information 912.

Communications within the projection system 900 may occur on any number of networks which may include wireless networks, cable networks, satellite networks, private networks, publicly switched telephone networks (PSTN), data or packet networks, or other types of communication networks. The network 904 is infrastructures for sending and receiving messages, voice communications, signals, and information according to one or more designated formats, standards, and protocols. In particular, the projection phone 906 may receive feeds or other syndicated information through the network. The network 904 of the projection system 900 may represent a single communication service provider or multiple communications services providers. The features, services, and processes of the illustrative embodiments may be implemented by the projection phone 906 and one or more elements of the communications system 900 independently or as a networked implementation. The network 904 may include one or more devices and communications channels for communicating voice communications, data, packets, and/or other information. The network 904 may include control and management devices, software, and communications lines and links suitable for directing telecommunications to a specified location or device. The network 904 may communicate with the projection phone 906 through one or more wired or wireless connections. For example, the connection may be a standard analog connection, a VOIP connection, or a WiFi connection.

The server 902 is a device or application that communicates data, information, or messages to the projection phone 906 through the network 904. The user may provide user input or requests through the projection phone 906, a client device, or other communications equipment in order to receive content from the server 902. The server 902 represents one or more servers that may be stand-alone devices or may be integrated with other systems, programs, or devices, such as the network 904. The server 902 may be configured to provide information to the phone 906 through the use of a network connection. For example, the server 902 may communicate information to the phone 906 including news, sports, stock updates, or weather updates.

In another embodiment, information sent to the projection phone 906 may be customized even further. When subscribing to receive content from a website or from a service provider operating the server 902, a user may specify that only information pertaining to the user's area code is sent. If a tornado warning was issued for their area it may automatically be displayed by the projector.

In another embodiment, information communicated to the projection phone 906 and displayed by the integrated projector 908 may include a presentation. For example, a calling party may communicate a slideshow that is automatically projected by the integrated projector 908 of the projection phone 906 during a conversation. The projection phone 906 may allow a user to receive data, information, presentations, and images without tying up a client device, such as the user's work computer.

The projection phone 906 may include a graphical user interface which may include selection elements and options for configuring the integrated projector 908.

The projection field 910 may be created by an integrated projector 908. The projection field 910 may be created through the use of light emitting diodes (LED), digital light processing (DLP), or lasers. The integrated projector 908 may use a laser light source which may allow the projected information to always be in focus. In another embodiment, the integrated projector 908 may use an LED with an integrated sensor to determine the distance to the display surface, thereby allowing optimal clarity for the projected information and images.

The projection information 912 may include any number of feeds or other information. The syndicated feeds may include any content, wires, subscription services, polled information, or other content that may be streamed to the projection phone 906, retrieved, or otherwise requested. In one embodiment, the syndicated feed may include a priority or importance level for each feed or newly added information. As a result, the user may establish user preferences in order to project only new or highly important information.

The integrated projector 908 may be a fixed position projector, only displaying information straight on. In another embodiment, the integrated projector 908 may pivot, allowing the angle of projection to be adjusted. For example, using buttons, touch screens, soft keys, or other elements of the projection phone 906, the user may point the integrated projector 908 at a desired surface. In one embodiment, the integrated projector 908 may use logic to display the information on a specified surface. For example, incoming call information may be displayed on a portion of a desk in the color red, incoming images may be directed at a white wall and displayed in full color, and presentations may be directed higher up at the same wall. An adjustable projector may allow a user to display information on a desired surface.

In one embodiment, the integrated projector 908 may be an integrated part of the projection phone 906. In another embodiment, the integrated projector 908 may use a USB, firewire, or other port to attached to the projection phone 906. The integrated projector 908 may be attached or detached from the projection phone 906, as needed. For example, the integrated projector 908 may be attached to the VoIP phone, as well as any number of wireless messaging devices or other communications equipment. The integrated projector 908 may receive projection information, as well as power through a connection to the projection phone 906. However, multiple connections, ports, leads, or other conductors may be utilized to transfer display information and power used by the integrated projector 908.

Figure 10:
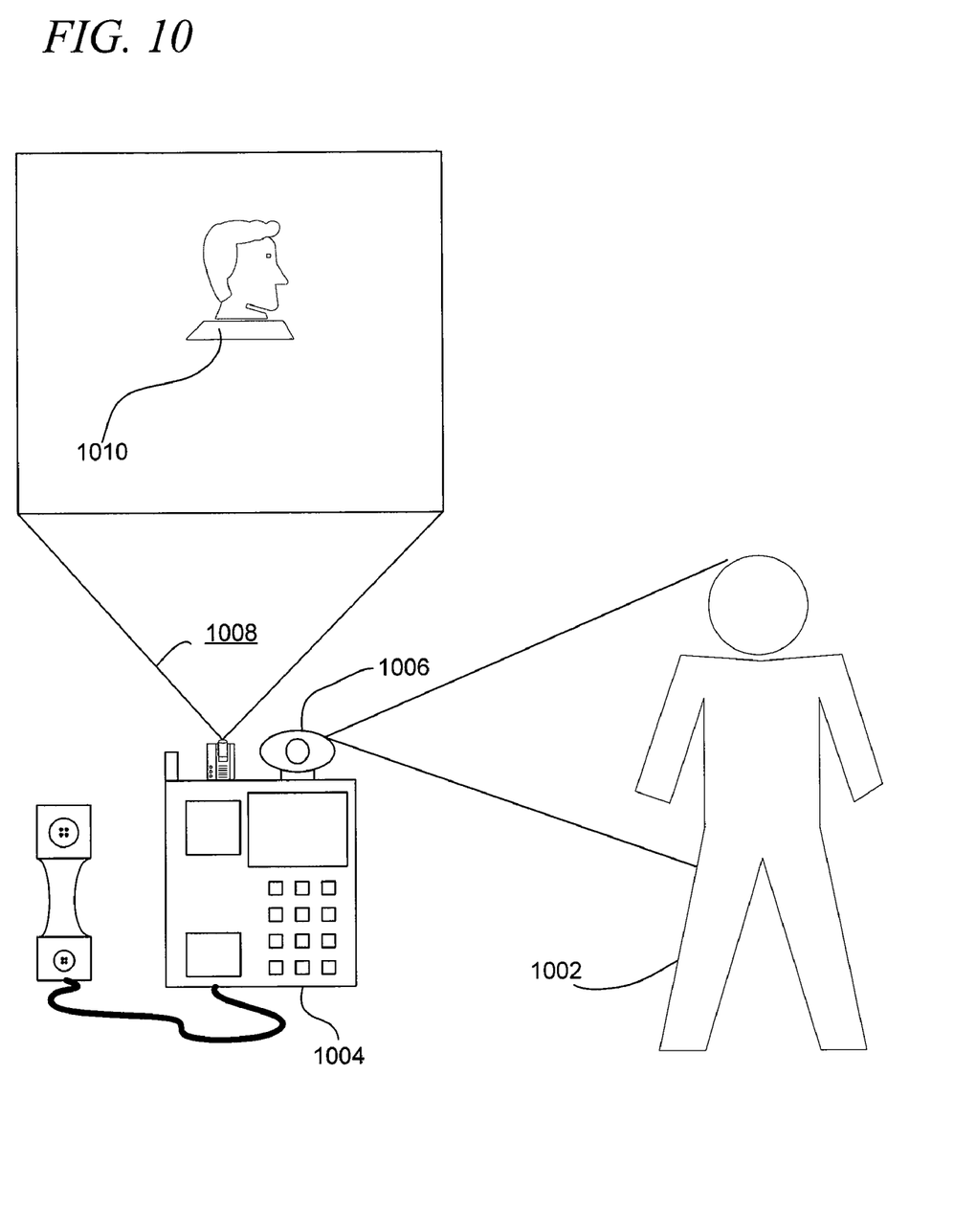
FIG. 10 is a pictorial representation of an interactive projection phone system in accordance with an illustrative embodiment.

FIG. 10 is a pictorial representation of an interactive projection phone system in accordance with an illustrative embodiment. The process of projecting information may include a user 1002, a projection phone 1004, a camera 1006, a projection field 1008, and a projection display 1010 which may include a caller's image.

The user 1002 may be able to view a communicating party projected from the projection phone 1004. The caller's image shown in the projection display 1010 may be in color, black and white, or other color or display selections. Receiving a video call may activate the projection phone 1004 which generates the projection field 1008 to display a caller's image in the projection display 1010.

The phone 1004 may also include a camera 1006. The camera 1006 is a visual recording device suitable for storing and communicating static or live images for the projection phone 1004 through a network connection. The camera 1006 may allow the projection phone 1004 to communicate the user's image to one or more communicating parties. The camera 1006 may be an integrated camera or it may be a camera linked to the phone.

Figure 11:
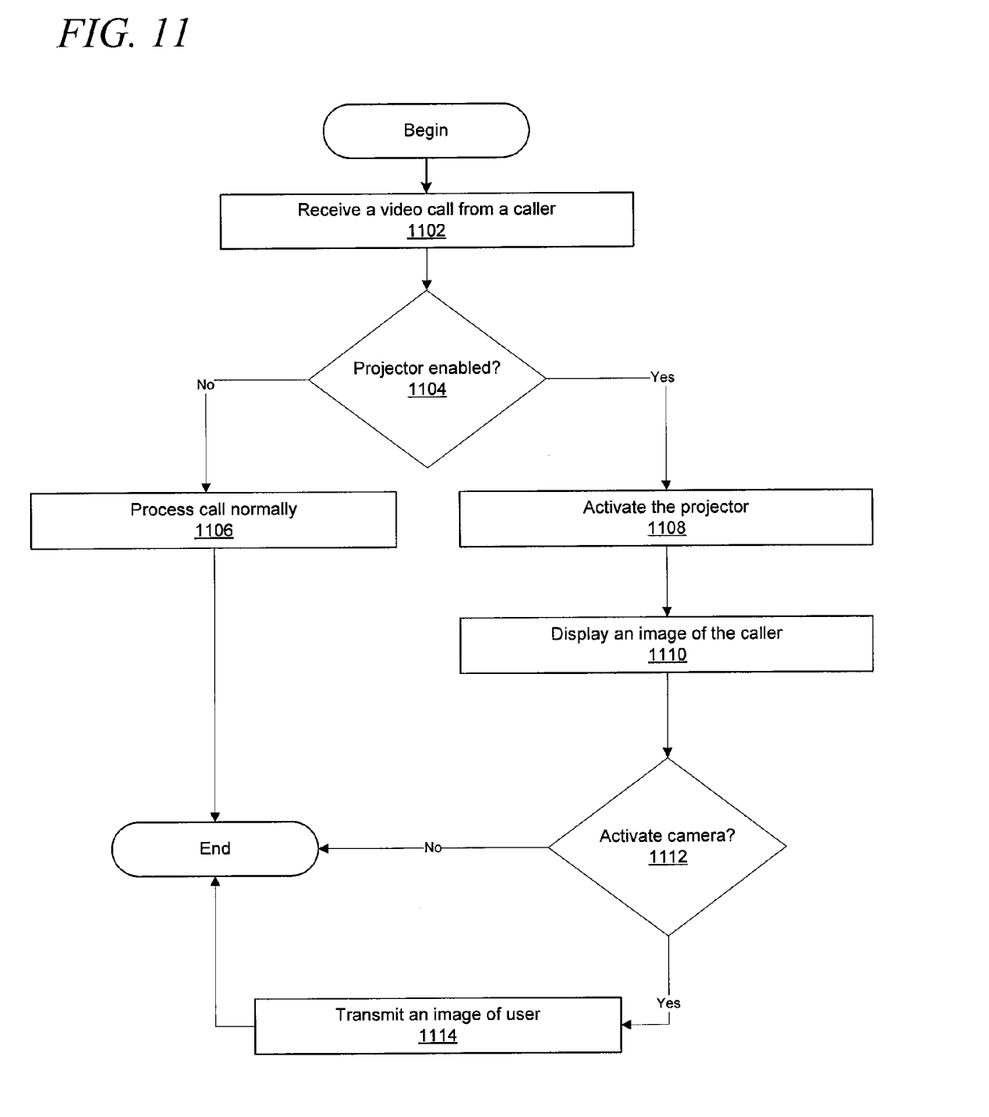
FIG. 11 is a flowchart of a process for projecting video call information in accordance with an illustrative embodiment.

FIG. 11 is a flowchart of a process for projecting video call information in accordance with an illustrative embodiment. The process of FIG. 11 with be implemented by a VoIP phone enabled for projection or a projection phone. The process may begin when the VoIP phone receives a video call from a caller (step 1102). The video call may be any number of calls including a standard phone call, a call with an included presentation or data signal, and any number of video call formats. The process of FIG. 11 may similarly be repeated for an outgoing call utilizing the projector of the VoIP phone.

Next, the VoIP phone determines whether the projector is enabled (step 1104). The determination of step 1104 may be made based on user settings, user preferences, or other information. For example, the user may have programmed the VoIP phone to not activate the projector from the times of 11:00 a.m. to 5:00 p.m. from the user's family. If the projector is not enabled, the VoIP phone processes the call normally (step 1106). In other words, the VoIP phone processes the call as if there were no displayable content communicated to the VoIP phone.

If the VoIP phone determines the projector is enabled in step 1104, the VoIP phone activates the projector (step 1108). The projector may be turned on, warmed up, or enabled in step 1108. Next, the VoIP phone displays the image of the caller (step 1110). The VoIP phone may display the image on a specified display surface based on the user preferences or based on another selection.

Once a video call is received 1102 a decision may be made that would enable the projector 1104 or simply allow the call to be processed normally. The decision to enable the projector 1104 may be configured to respond according to user preferences through the use of a graphical user interface as shown in FIG. 8.

If the decision was made to enable the projector 1104, the process may continue by activating the integrated projector 1108. Once the projector was activated 1108 this may allow the caller's image to be displayed 1110.

Next, the VoIP phone determines whether to activate the camera (step 1112). The camera may be a video camera, digital camera, or web camera integrated or externally connected to the VoIP phone. The determination of step 1112 may also be made based on user preferences, characteristics of the call, or other settings. For example, in response to receiving the video call, the camera may automatically be activated unless selected otherwise by the user.

If the VoIP phone determines not to activate the camera, the process terminates with the projector of the VoIP phone broadcasting the image of the caller. If the VoIP phone determines to activate the camera in step 1112, the VoIP phone transmits an image of the caller (step 1114). As a result, the call may be a true video call enabled between one or more projection phones. The user may point the camera of the VoIP phone to capture images or video of the user.

The previous detailed description is of a small number of embodiments for implementing the invention and is not intended to be limiting in scope. The following claims set forth a number of the embodiments of the invention disclosed with greater particularity.

What is claimed:

1. A method for projecting information from a phone, the method comprising:
   receiving user preferences for projection, the user preferences indicating information associated with one or more types of communications;
   receiving a communication;
   determining whether the received communication is one of the one or more types of communications associated with the user preferences;
   projecting the indicated information associated with the received communication in response to the determination, the indicated information being projected by a projector integrated with the phone onto a display surface; and
   displaying a syndicated feed at an interval based on the user preferences, wherein the indicated information is projected from a base station of the phone, wherein a user configures a light intensity, color, and the interval, wherein a user configures the information to be displayed by the projector, and wherein a user configures an alert to accompany the projection of the indicated information.

2. The method according to claim 1, further comprising:
   recording an image of the user utilizing the phone for transmission to a communicating party.

3. The method according to claim 1, further comprising:
   determining the display surface to utilize from one or more display surfaces based on the one or more types of communication.

4. The method according to claim 1, wherein the user subscribes to the syndicated feed, and wherein the syndicated feed is retrieved from a server.

5. The method according to claim 1, wherein the one or more types of communications are any of caller identification information received during a call, an image of a communicating party, a document, and a presentation.

6. The method according to claim 1, wherein the indicated information is retrieved from an electronic calendar.

7. The method according to claim 1, wherein the indicated information is a video call.

8. A phone configured for projection comprising:
   display logic configured to determine that a communication includes information selected for display based on user preferences;
   a projector integrated with a base station, the projector in communication with the display logic, the projector configured to project the information onto a surface; and
   a camera in communication with the display logic, the camera configured to capture an image of the user, wherein the information and the image are utilized for a video communication.

9. The phone according to claim 8, wherein the phone is any of a voice over Internet Protocol (VoIP) phone, WiFi phone or plain old telephone service telephone.

10. The phone according to claim 8, further comprising:
    a user interface in communication with the display logic, the user interface is configured to receive the user preferences that control projection of the information; and
    a transceiver in communication with the display logic, the display logic receives caller identification information from the transceiver.

11. The phone according to claim 8, wherein the display logic activates the projector in response to determining an event is occurring, wherein the event is any of a calendar entry and alarm.

12. The phone according to claim 8, wherein the projector may directionally project the information based on user preferences, and wherein the video communication is a video conference.

13. The phone according to claim 8, wherein the projector is a laser display configured to determine the location of a nearest surface, and wherein the laser displays the information on the nearest surface.

14. A VoIP phone configured for projection comprising:
a processor for executing a set of instructions; and
a memory in communication with the processor, the memory is operable to store the set of instructions, wherein the set of instructions are configured to:
receive user preferences for projecting information, the user preferences indicating information associated with one or more types of communications;
receive a communication;
determine whether the received communication is one of the one or more types of communications associated with the user preferences;
project the indicated information associated with the received communication in response to the determination, the indicated information being projected by a projector integrated with the VoIP phone onto a surface; and
project one or more syndicated feeds at an interval based on the user preferences, wherein the indicated information is projected from a base station of the VoIP phone, wherein a user configures a light intensity, color, and the interval, wherein a user configures the indicated information to be displayed by the projector, and wherein a user configures an alert to accompany the projection of the indicated information.

15. The VoIP phone according to claim 14, wherein the user preferences are received through a user interface of the VoIP phone.

16. The VoIP phone according to claim 14, wherein the projector projects the displayable content to one of a plurality of display surfaces based on a category of the indicated information.

17. The VoIP phone according to claim 14, wherein the indicated information is displayed by the projector utilizing one or more light emitting diodes or lasers.

18. The VoIP phone according to claim 14, wherein the syndicated feeds are received from one or more servers configured to deliver content based on a user selection.

* * * * *